United States Patent [19]

Mine et al.

[11] 4,268,452

[45] May 19, 1981

[54] NONCURABLE SEALING MATERIALS

[75] Inventors: Katsutoshi Mine, Ichihara; Yoshitaka Kubota, Chiba; Tsuneo Maruyama, Ichihara, all of Japan

[73] Assignee: Toray Silicone Company, Ltd., Tokyo, Japan

[21] Appl. No.: 128,604

[22] Filed: Mar. 10, 1980

[51] Int. Cl.³ .......................................... C08L 83/04
[52] U.S. Cl. ............................................ 260/37 SB
[58] Field of Search ................................ 260/37 SB

[56]      References Cited

U.S. PATENT DOCUMENTS

| | | |
|---|---|---|
| 3,105,061 | 9/1963 | Bruner . |
| 3,133,110 | 5/1964 | Morehouse et al. . |
| 3,462,386 | 8/1969 | Goossens ................... 260/37 SB |
| 3,817,909 | 6/1974 | Toporcer et al. ........... 260/37 SB |
| 4,012,375 | 3/1977 | Hahn ......................... 260/33.2 SB |
| 4,020,044 | 4/1977 | Crossan et al. . |
| 4,071,498 | 1/1978 | Frye et al. . |
| 4,075,154 | 2/1978 | Itoh et al. ................... 260/37 SB |
| 4,108,832 | 8/1978 | Hahn ......................... 528/32 |

FOREIGN PATENT DOCUMENTS 823239  9/1969  Canada .

*Primary Examiner*—Lewis T. Jacobs
*Attorney, Agent, or Firm*—Roger H. Borrousch

[57]            ABSTRACT

A noncurable sealing material from a hydroxyl endblocked polydiorganosiloxane, a filler and a silane or siloxane with two hydrolyzable groups having silicon-nitrogen bonds or silicon-oxygen-nitrogen bonds. The material when mixed and stored under substantially anhydrous conditions remains fluid but when exposed to the moisture in air increases in viscosity to form a sealing material which is uncured.

18 Claims, No Drawings

NONCURABLE SEALING MATERIALS

BACKGROUND OF THE INVENTION

1. Field of the Invention

The present invention relates to noncurable sealing materials.

2. Description of the Prior Art

Sealing materials can be roughly divided into noncurable sealing materials and curable sealing materials. Both types are materials which are used for filling joints for the purpose of water-tightness and air-tightness, and are widely utilized in construction and engineering work, vehicles, automobiles and airplanes. Especially in the case of construction work, these sealing materials are widely used at joints between various parts, to seal windows to window frames and for joints and gaps produced by the occurrence of cracks.

Noncurable glazier's putty and oily caulking materials are known as noncurable sealing materials. The former consists primarily of oils and fats and the latter also consists primarily of oils and fats, polybutene and alkyd resins. Thus, they have poor weather resistance. There is the drawback that the life of these sealing materials is short when they are used outdoors. There is also the drawback that they cannot be used at positions at high temperature because of their poor heat resistance. In addition, silicone oil sealing materials and sealing materials consisting primarily of nonreactive silicone oil and a filler have the drawback that separation of oil phase occurs easily. If a highly viscous silicone oil is used for decreasing the oil phase separation, the viscosity of the sealing material increases and there is the drawback that workability during the sealing process decreases.

DESCRIPTION OF THE INVENTION

The present invention provides a new material without the drawbacks of the above-mentioned known common noncurable sealing materials.

This invention relates to a noncurable sealing material comprising a composition which increases in viscosity on contact with moisture, does not cure and substantially maintains its initial viscosity when stored in a container which does not substantially allow moisture to penetrate, consisting essentially of a product obtained by mixing the following ingredients under substantially anhydrous conditions (a) 100 parts by weight of a polydiorganosiloxane having silicon-atom-bonded hydroxyl groups at the terminus of the molecule chains, the organic groups of the polydiorganosiloxane being substituted or unsubstituted monovalent hydrocarbon radicals and said polydiorganosiloxane having a viscosity of 0.5 m²/s or less at 25° C., (b) from 1 to 500 parts by weight of a filler and (c) an amount of an organosilicon compound sufficient to supply silicon-bonded nitrogen groups or groups having silicon-oxygen-nitrogen bonds in at least the same molar amount as the total molar amount of silicon-atom-bonded hydroxyl groups in (a), said organosilicon compound having two moisture hydrolyzable groups per molecule and said groups being selected from the group consisting of silicon-bonded nitrogen groups and groups having silicon-oxygen-nitrogen bonds.

The components of this invention will be explained individually below. Component (a) is a polydiorganosiloxane of the following general formula having silicon atom-bound hydroxyl groups at the terminus of the molecular chain:

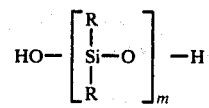

where R represents substituted or unsubstituted monovalent hydrocarbon radicals selected from among methyl, ethyl, propyl, octyl, phenyl, vinyl and trifluoropropyl groups, and m is a number such that the viscosity at 25° C. is 0.5 m²/s or less. If the viscosity at 25° C. exceeds 0.5 m²/s, the workability when the composition is prepared by adding a filler, component (b) and a chain extension agent, component (c), and the workability and process when the composition is discharged from containers such as cartridges, tubes and plastic film containers, become very poor. In addition, if the viscosity is too low, the composition leaks out of the sealed container and the increase in viscosity is inadequate after filling a gap or cavity. The viscosity preferably ranges from 0.00005 to 0.05 m²/s.

The silicon-atom-bonded hydroxyl group at the terminus of the molecular chain is a functional group which is required for the condensation of component (a) with component (c) in the presence of moisture for obtaining higher molecular weight and higher viscosity.

Component (a) can be a polymer of a single viscosity or a mixture of two or more viscosities.

Component (b) of this invention is a filler which is used to modify the viscosity of component (a). For example, the following fillers can be used: dry-process silica (fumed silica), wet-process silica (precipitated silica), diatomaceous earth, fine quartz powder, talc, mica powder, calcium carbonate, magnesium carbonate, carbon black, asbestos powder and glass powder.

The amount of component (b) ranges from 1 to 500 parts by weight per 100 parts by weight of component (a). However, it is arbitrarily selected within the above-mentioned range according to the types of fillers used and in particular, the specific gravity and thickening ability, and according to the viscosity of organopolysiloxane. In the case of the fillers having a high thickening ability, i.e. dry-process silica, wet-process silica, carbon black, asbestos powder, non-surface-treated light and fine calcium carbonate, the amount used is relatively small, while in the case of the fillers having a relatively low thickening ability, i.e. diatomaceous earth, fine quartz powder, mica powder, surface-treated precipitated calcium carbonate and heavy calcium carbonate, the amount used is perferably higher.

Component (b) can be a single filler or a mixture of two or more fillers.

Component (c) is a component which helps increase molecular weight and viscosity by lengthening the polydioganosiloxane chain, component (a), when the sealing material of this invention is discharged into air from a sealed container. That is, component (c) is a bifunctional diorganosilane or bifunctional diorganosiloxane which is hydrolyzable with water. These compounds are generally expressed by the general formula:

where $R^1$ and $R^2$ are each an unsubstituted or substituted monovalent hydrocarbon radical and X is a hydrolyzable group selected from the group consisting of silicon-bonded nitrogen groups and groups having silicon-oxygen-nitrogen bonds, or the general formula:

where R, $R^1$, $R^2$ and X are defined above, and n has a value in the range of from 0 to 30 inclusive. In addition, the above-mentioned diorganosiloxane can contain a cyclic group. In these formulas, R, $R^1$ and $R^2$ represent alkyl groups such as methyl, ethyl, and propyl, alkenyl groups such as vinyl, allyl and butadienyl, aryl groups such as phenyl, xylenyl and naphthyl, cycloalkyl groups such as cyclohexyl, cycloalkenyl such as cyclohexenyl, aralkyl groups such as benzyl, alkaryl groups such as tolyl and xylyl, and their substituted groups. R, $R^1$ and $R^2$ can be selected from the same or different groups.

X is a group which is hydrolyzable with water and which is bonded to a silicon atom. Examples of the hydrolyzable groups are amino groups

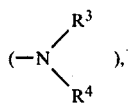

amido groups

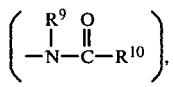

imido groups

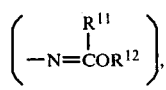

lactam groups

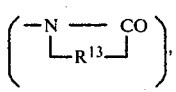

aminoxy groups

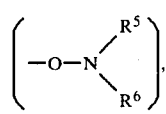

oxime groups

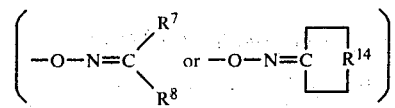

In these formulas, $R^3$ through $R^{12}$ each represent a hydrogen atom or unsubstituted or substituted monovalent hydrocarbon radical. Examples are the same as those described as examples of R, $R^1$ and $R^2$. In terms of ease of preparation of silanes and siloxanes having these functional groups, $R^3$ through $R^{12}$ are preferably selected from among unsubstituted and substituted monovalent hydrocarbon radicals. $R^{13}$ and $R^{14}$ represent alkylene groups.

Examples of component (c) are as follows: aminosilanes and aminosiloxanes such as $(CH_3)_2Si[NH(C_4H_9)]_2$, $(CH_3)_2Si[NH(C_6H_5)]_2$, $(CH_3)_2Si[N(CH_3)_2]_2$, $(CH_3)(C_6H_5)Si[N(CH_3)_2]_2$, $(CH_3)(CH_2=CH)Si[N(CH_3)_2]_2$, $(CH_3)_2Si[N(C_2H_5)_2]_2$, $(CH_3)(C_6H_5)Si[N(CH_3)(C_2H_5)]_2$, $(CH_3)(C_6H_5)Si[N(CH_3)(C_2H_5)]_2$,

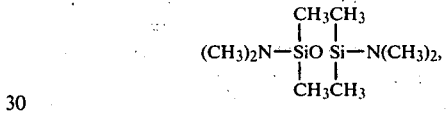

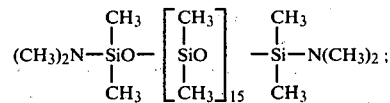

aminoxysilanes and aminoxysiloxanes such as $(CH_3)_2Si[ON(CH_3)_2]_2$, $(CH_3)(C_6H_5)Si[ON(CH_3)_2]_2$, $(CH_3)(CH_2=CH)Si[ON(CH_3)_2]_2$, $(CH_3)_2Si[ON(CH_3)(C_2H_5)]_2$, $(CH_3)(CH_2=CH)Si[ON(C_2H_5)_2]_2$,

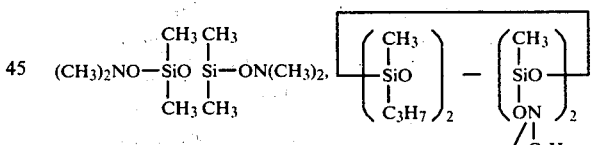

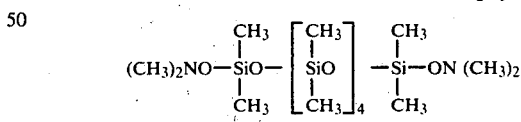

or oximesilanes and oximesiloxanes such as $(CH_3)_2Si[ON=C(CH_3)_2]_2$, $(CH_3)(CH_2=CH)Si[ON=C(CH_3)_2]_2$, $(CH_3)_2Si[ON=C(CH_3)(C_2H_5)]_2$, $(CH_3)(C_6H_5)Si[ON=C(CH_3)(C_2H_5)]_2$,

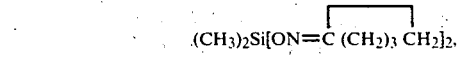

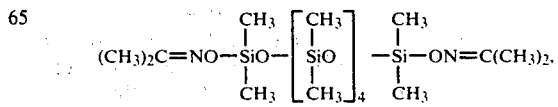

-continued

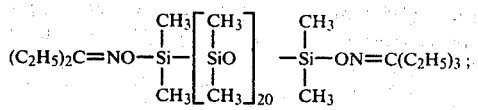

or amidosilanes and amidosiloxanes such as

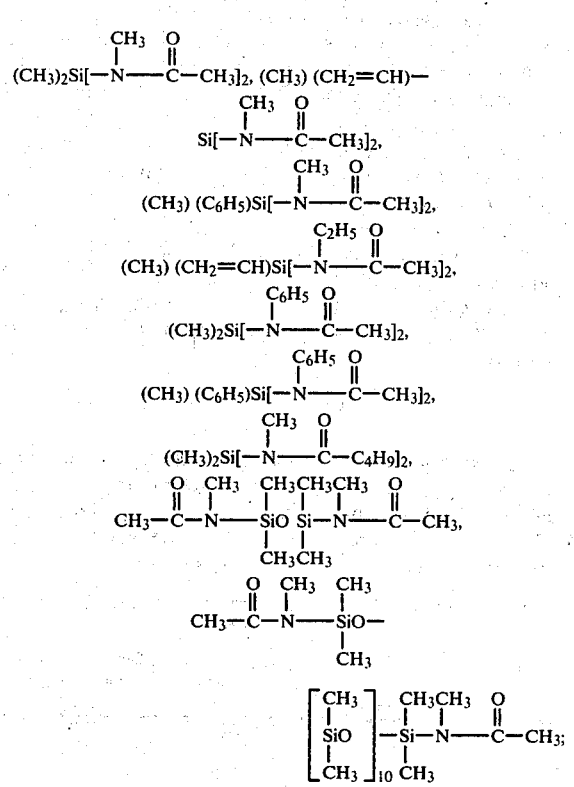

or imidosilanes and imidosiloxanes such as

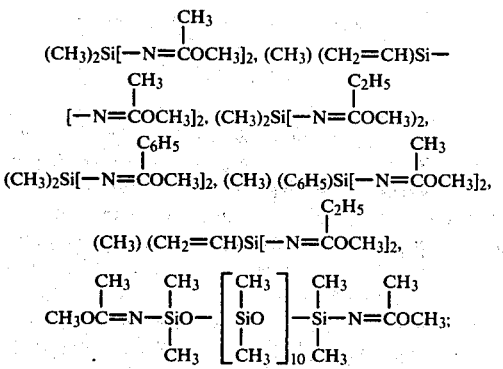

or lactamsilanes and lactamsiloxanes such as

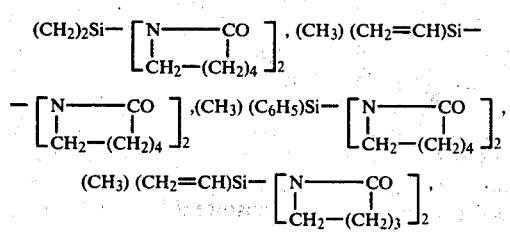

-continued

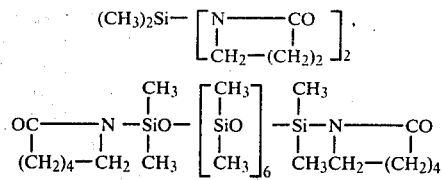

Component (c) can be a single compound or a mixture of two or more compounds. However, when two or more types are used in a mixture, an X group which is hydrolyzable is preferably selected from the same type of group. The amount of organosilicon compound used is an amount sufficient to supply silicon-bonded nitrogen groups or groups having silicon-oxygen-nitrogen bonds in at least the same molar amount as the total molar amount (mol%) of silicon atom-bonded hydroxyl groups at the terminus of the molecular chain in component (a).

By so doing, the composition of this invention can be preserved for a long period when prepared under substantially anhydrous conditions and when stored under substantially anhydrous conditions. When it is discharged into air, a highly viscous product is obtained and an extremely viscous form of putty can be produced.

In addition to components (a), (b) and (c), a catalyst which accelerates the reaction between component (a) and component (c), i.e. diorganotin dicarboxylate, can be added. In addition, various additives which are generally compounded in the conventional silicone oil sealing materials, i.e. inorganic pigments, organic pigments, heat resistance agents, tackiness-improving agents, anti-sagging agents, and flame retardants, can be added.

The composition of this invention can be produced as follows. For example, component (b) is added to component (a) and the mixture is blended in any of various types of blenders until a homogeneous mixture is obtained. After degassing, component (c) is added and the mixture is again blended until a homogeneous mixture is obtained. In this case, the moisture must be eliminated as much as possible from the mixture of component (a) and component (b), and component (c) must be added and blended under substantially anhydrous conditions. The obtained sealing material can be sucked up by a caulking gun and subsequently used in sealing work. Alternatively, the sealing material can be packed in a container which does not substantially allow moisture to permeate, e.g. cartridges, aluminum foil tubes and plastic film containers, and sealed for preservation. Thereafter, the stored sealing material can be used when needed.

The sealing material of this invention has the following characteristics and effects: (1) If it is stored in a container which does not substantially allow moisture to permeate, the viscosity is unchanged after long-term storage; (2) since a polydiorganosiloxane having a low viscosity is used, it can be easily discharged from the container; (3) a gap or cavity can be easily filled; (4) the finishing work for the position filled is very easy; (5) the viscosity increases greatly in a time period of from one day to a few days after filling and an extremely viscous putty-like substance can be obtained; and (6) the obtained putty-like substance has excellent air-tightness and water-tightness, and no oil phase separation occurs after it is stored for a long period. This noncurable sealing material is especially useful as a sealing material for construction and civil engineering work.

The following examples are presented for illustrative purposes and should not be construed as limiting the scope of the invention which is delineated in the claims. "Parts" indicated in the following examples means "parts by weight". The viscosity was the value at 25° C. The atmosphere for the sealing work was as follows: 23°–25° C. at 60–65% relative humidity.

EXAMPLE 1

Polydimethylsiloxane having hydroxyl terminal groups with a viscosity of 0.015 m$^2$/s (100 parts) was well mixed with light, fine calcium carbonate without surface treatment (average particle size: 0.1μ and BET relative surface area: 7.5 m$^2$/g) (45 parts). After degassing, dimethyldi(N-methyl-acetamido)silane (8 parts) was added and the mixture was blended in a closed system without contact with moisture. The mixture obtained was packed in an aluminum tube. The material was squeezed out from the aluminum tube by hand and a vertical joint with a depth of 5 mm and a width of 8 mm, along a precast concrete plate, was filled with the contents of the aluminum tube. After 3 days, an extremely viscous putty had formed to a depth of 5 mm. After 6 months, no dripping had occurred nor was any separation of an oil phase observed. When this sealing material was stored in the aluminum tube at room temperature for 6 months, no changes occurred in its viscosity and it could still be squeezed out very easily by hand.

EXAMPLE 2

Polydimethylsiloxane having hydroxyl terminal groups with a viscosity of 0.002 m$^2$/s (100 parts) was well mixed with dry-process silica whose surface had been treated with trimethylchlorosilane as a hydrophobic treatment and whose BET relative surface area was 130 m$^2$/g (20 parts). After degassing, methylvinyl-di(N,N-diethylaminoxy)silane (10 parts) was added. The mixture was blended in a closed system without contact with moisture and the obtained mixture was packed in a paper cartridge whose interior surface was lined with aluminum foil. This paper cartridge was loaded in a hand gun. The content was squeezed out by hand and used to fill a horizontal groove between a plate of glass and an aluminum window sash (depth: 7 mm, width: 4 mm). After 5 days, an extremely viscous putty had formed to a depth of 7 mm. After 6 months, no separation of an oil phase was found. When this sealing material was stored in the paper cartridge for 6 months, no changes occurred in viscosity and the sealing material could still be easily squeezed out using a hand gun.

EXAMPLE 3

Dimethylsiloxane-methylphenylsiloxane copolymer having hydroxyl groups at the molecular chain terminus with a viscosity of 0.008 m$^2$/s (phenyl group content: 5 mol%) (100 parts) was well mixed with dry-process silica having a BET relative surface area of 200 m$^2$/g (10 parts). After degassing, methylphenyldi(N-cyclohexylamino)silane (11 parts) was added and the mixture was blended in a closed system without contact with moisture. The mixture was packed in a cylindrical container made of polyvinylidene chloride film and the container was wrapped with an evaporation-aluminized polyvinylidene chloride film. After 6 months, the external evaporation-aluminized polyvinylidene chloride film wrapper was taken off and the cylindrical container made of polyvinylidene chloride film was loaded in a hand gun. The material was squeezed out by hand and a horizontal groove between ALC panels (depth: 10 mm, width: 12 mm) was filled with the content. After 7 days, an extremely viscous putty was formed to a depth of 10 mm. After 6 months, no separation of an oil phase was found.

EXAMPLE 4

Sealing materials were prepared using the following compounds as component (c) as shown in the following table under the same conditions as in Example 1. The characteristics were evaluated and are shown in the following table.

| Component (c) | Amount added (parts) | Squeezability | Days required for forming an extremely viscous putty to a depth of 5 mm | Separation of oil phase after 6 months |
|---|---|---|---|---|
| α,ω-Bis[dimethyl (N,N-diethylaminoxy)] dimethylsiloxane (degree of polymerization: 10) | 20 | good | 3 days | none |
| Methylvinyldi (methylethylketoxime)silane | 10 | good | 5 days | none |

EXAMPLE 5

In the sealing material as in Example 1, colloidal calcium carbonate (120 parts) (average particle size: 0.04μ, BET relative surface area: 31 m$^2$/g) with a treated surface was used instead of the light, fine calcium carbonate under the same conditions as in Example 1. The prepared sealing material was packed in an aluminum tube. The material was squeezed out from the aluminum tube and a horizontal groove between a plate of glass and an aluminum window sash (depth: 7 mm, width: 4 mm) was filled with this sealing material. After 5 days, an extremely viscous putty had formed to a depth of 7 mm. After 6 months, no separation of an oil phase had occurred. No changes occurred in its viscosity after leaving this sealing material in the aluminum tube at room temperature and the contents could still be squeezed out easily by hand.

That which is claimed is:

1. A noncurable sealing material comprising a composition which increases in viscosity on contact with moisture, does not cure and substantially maintains its initial viscosity when stored in a container which does not substantially allow moisture to penetrate, consisting essentially of a product obtained by mixing the following ingredients under substantially anhydrous conditions (a) 100 parts by weight of a polydiorganosiloxane having silicon-atom-bonded hydroxyl groups at the terminus of the molecular chains, the organic groups of the polydiorganosiloxane being substituted or unsubstituted monovalent hydrocarbon radicals and said polydiorganosiloxane having a viscosity of 0.5 m²/s or less at 25° C., (b) from 1 to 500 parts by weight of a filler and (c) an amount of an organosilicon compound sufficient to supply silicon-bonded nitrogen groups or groups having silicon-oxygen-nitrogen bonds in at least the same molar amount as the total molar amount of silicon-atom-bonded hydroxyl groups in (a), said organosilicon compound having two moisture hydrolyzable groups per molecule and said groups being selected from the group consisting of silicon-bonded nitrogen groups and groups having silicon-oxygen-nitrogen bonds.

2. The material according to claim 1 in which the viscosity at 25° C. of the polydiorganosiloxane of (a) is in the range of 0.00005 to 0.05 m²/s.

3. The material according to claim 1 in which the organosilicon compound of (c) is a diorganosilane of the general formula

where $R^1$ and $R^2$ are each an unsubstituted or substituted monovalent hydrocarbon radical and X represents the hydrolyzable group.

4. The material according to claim 2 in which the organosilicon compound of (c) is a diorganosilane of the general formula

where $R^1$ and $R^2$ are each an unsubstituted or substituted monovalent hydrocarbon radical and X represents the hydrolyzable group.

5. The material according to claim 1 in which the organosilicon compound of (c) is a siloxane of the average general formula

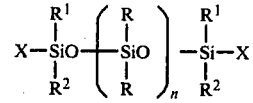

where R, $R^1$ and $R^2$ are each an unsubstituted or substituted monovalent hydrocarbon radical, n has a value in the range of from 0 to 30 inclusive, and X represents the hydrolyzable group.

6. The material according to claim 2 in which the organosilicon compound of (c) is a siloxane of the average general formula

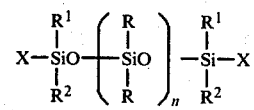

where R, $R^1$ and $R^2$ are each an unsubstituted or substituted monovalent hydrocarbon radical, n has an average value in the range of from 0 to 30 inclusive, and X represents the hydrolyzable group.

7. The material according to claim 1 in which the hydrolyzable group is selected from the group consisting of an amino group, an amido group, an imido group, a lactam group, an aminoxy group and an oxime group.

8. The material according to claim 4 in which X is a hydrolyzable group selected from the group consisting of an amino group, an amido group, an imido group, a lactam group, an aminoxy group and an oxime group.

9. The material according to claim 6 in which X is a hydrolyzable group selected from the group consisting of an amino group, an amido group, an imido group, a lactam group, an aminoxy group and an oxime group.

10. The material according to claim 8 in which X is an amino group.

11. The material according to claim 10 in which the amino group is a monorganoamino group.

12. The material according to claim 10 in which the amino group is a diorganoamino group.

13. The material according to claim 8 in which X is an amido group.

14. The material according to claim 13 in which the amido group is an N-organoamido group.

15. The material according to claim 8 in which X is an aminoxy group.

16. The material according to claim 15 in which the aminoxy group is a diorganoaminoxy group.

17. The material according to claim 8 in which X is an oxime group.

18. The material according to claim 17 in which the oxime group is a diorganoketoxime group.

* * * * *

UNITED STATES PATENT AND TRADEMARK OFFICE
CERTIFICATE OF CORRECTION

PATENT NO.  : 4,268,452
DATED       : May 19, 1981
INVENTOR(S) : Katsutoshi Mine, Yoshitaka Kubota, Tsuneo Maruyama It is certified that error appears in the above—identified patent and that said Letters Patent is hereby corrected as shown below:

Column 1, line 27 - the word "temperature" should read "temperatures"

Column 5, line 61 - the portion of the formula reading "$(CH_2)_2Si-$" should read "$(CH_3)_2Si-$"

Signed and Sealed this

Twentieth Day of April 1982

[SEAL]

Attest:

Attesting Officer

GERALD J. MOSSINGHOFF

Commissioner of Patents and Trademarks